United States Patent

[11] 3,603,774

[72] Inventors Giorgio DeVarda; Saverio Martinelli; Aldo Perna, all of Milan, Italy
[21] Appl. No. 735,606
[22] Filed June 10, 1968
[45] Patented Sept. 7, 1971
[73] Assignee Societa Italiana Telecomunicazioni Siemens S.p.A. Milan, Italy
[32] Priority June 9, 1967
[33] Italy
[31] 17,009/68

[54] SYSTEM FOR THE MODIFICATION OF DATA STORED IN RECIRCULATING DELAY LINES
11 Claims, 5 Drawing Figs.

[52] U.S. Cl. .......... 235/168, 235/167
[51] Int. Cl. .......... G06f 7/50
[50] Field of Search .......... 235/168, 167, 165, 92

[56] References Cited
UNITED STATES PATENTS

| | | | |
|---|---|---|---|
| 3,414,889 | 12/1968 | Higgins et al. | 340/173 |
| 3,370,158 | 2/1968 | Lehmer | 235/168 X |
| 3,405,392 | 10/1968 | Milne et al. | 340/172.5 |
| 3,471,835 | 10/1969 | Gribble et al. | 235/165 X |

OTHER REFERENCES

J. E. Elliott; Increment-Decrement Logic IBM Technical Disclosure Bulletin, Vol. 11 No. 3, August, 1968, pp. 297–298

*Primary Examiner*—Malcolm A. Morrison
*Assistant Examiner*—David H. Malzahan
*Attorney*—Karl F. Ross

ABSTRACT: In a telecommunication system of the time-sharing type wherein several calls are concurrently conducted over a common line circuit by means of interleaved message signals recurring in a predetermined order, command pulses relating to the several calls are sequentially directed to the input of a register with several parallel memory stages each including a delay line whose delay time encompasses a number of pulse cycles equal to the maximum number of calls to be accommodated simultaneously by the line circuit. Digital pulses traveling along each memory stage are continuously fed back from the output to the input thereof for reinscription until modified by a command signal applied to all the memory stages through a logic matrix for carrying out such operations as "enter 1," "enter 0," "inscribe new number," "add 1" and "subtract 1."

Giorgio DeVarda
Saverio Martinelli
Aldo Perna
INVENTORS.

BY Karl F. Ross
ATTORNEY

Giorgio DeVarda
Saverio Martinelli
Aldo Perna
INVENTORS.

BY Karl F. Ross
ATTORNEY

Giorgio De Varda
Saverio Martinelli
Aldo Perna
INVENTORS.

BY Karl F. Ross
ATTORNEY

G. DeVarda
S. Martinelli
A. Perna
INVENTORS.

BY Karl G. Ross
ATTORNEY

SYSTEM FOR THE MODIFICATION OF DATA STORED IN RECIRCULATING DELAY LINES

Our present invention relates to a counting register for concurrently storing numerical information relating to a plurality of different items, such as telephone calls and other message transmissions in telecommunication systems, and for modifying the information so stored.

The use of electronic circuitry in computing the charges for telecommunication services, while highly advantageous, has not yet become universal. Difficulties exist, for example, in the case of telephone systems wherein several conversations are carried on simultaneously over a common trunk line, by the time-sharing technique, with the aid of interleaved code signals representing the instantaneous amplitudes of voice-frequency currents to be transmitted. It is known to compute the charge for each individual call on the basis of counting pulses periodically transmitted at a frequency depending upon the distance between the two interconnected subscribers; while the counting pulses pertaining to several concurrent message transmissions may be interleaved in the same predetermined order as the corresponding message signals, the routing of these pulses to different counting registers requires an involved circuit arrangement. The system becomes even more complex when different classes of calls are to be handled simultaneously by the same line circuit, such as local calls subject to a unit charge, toll calls charged to the account of the calling subscriber, and prepaid calls (e.g. from coin-operated stations) with progressive depletion of a preestablished credit balance.

An object of our invention is to provide a single register adapted to be used for the simultaneous storage of different trains of counting pulses, arriving in a predetermined cyclic succession, for individually computing the cost of several simultaneous telephone conversations or other overlapping events subject to different rates of charge.

Another object is to provide a universal register capable of utilization with a variety of different classes of service, such as those mentioned above, some of which may involve a recording of fixed numerical values while others may require an additive or subtractive modification of a value previously registered.

Thus, in a comprehensive charge-calculating system of the type specifically contemplated herein, the register should be responsive to command signals of the following character:

a. unit signals applying to local calls;

b. recurrent counting pulses relating to toll calls;

c. numerical pulses for entering a credit balance (e.g. upon the deposition of one or more coins) from which a unit is subtracted in response to each calling pulse;

d. cancellation signals to clear the register.

A more particular object of our invention is therefore to provide a register capable of storing a number of "words" for an indefinite period, and of modifying a selected word in response to any one of the aforementioned command signals upon the occurrence of such command signal at a particular point of an operating cycle.

In accordance with our invention, a register for the concurrent storage and selective modification of a plurality of binary words, conveying the numerical information referred to, comprises several substantially identical parallel memory stages, each stage including a delay line for the transmission of a series of digital pulses from an input of each stage to an output thereof; the fundamental recurrence period $\tau$ of these digital pulses is an aliquot part of the delay time $t$ of each of these lines, i.e. of an operating cycle of the register, so that $t=p\tau$ wherein $p$ is the maximum number of digital pulses that can be accommodated at any time on the delay line of any one stage. Thus, $p$ also represents the number of telephone calls or other messages concurrently transmittable over a line circuit associated with such register.

In order to perpetuate the information stored on the register, in the absence of a cancellation or modification signal, the output end of each delay line is coupled to the input end thereof through a feedback circuit which periodically reinscribes every digital pulse propagating along the line until a command pulse is applied to a logic matrix included in the feedback path. This logic matrix is divided into as many sections as there are memory stages and includes two sets of leads common to all its sections, the first set of leads receiving the command pulses (as well as numerical pulses for the inscription of a new number of this is to be one of the functions of the register) while the second set carries the output pulses of the several stages. Within each section of the logic matrix, several logic gates are connected to specific combinations of these leads for producing a control pulse which energizes the associated delay line to generate a digital pulse traveling therealong. In a preferred embodiment, these logic gates include several AND gates per section and a common OR gate receiving the outputs of all these AND gates to produce a control pulse under a variety of predetermined conditions of energization of the two sets of input leads. One of these input leads may be multiplied to all the AND gates of each stage and may be normally energized by the command circuitry, its deenergized state representing a cancellation signal which blocks conduction through any AND gate and therefore prevents reinscription of the digital pulses previously circulating in the several memory stages.

An important function contemplated for a counting register according to our invention is the algebraic summing, i.e. the performance of additions or subtractions, in response to a command such as "ADD 1" or "SUBTRACT 1" delivered to the logic matrix. Depending upon the value of the stored number which is to be subjected to such incremental modification, one or more bits of a circulating word must be changed into their complements so that every register stage is potentially affected. In the first section of the logic matrix, assigned to the stage for the lowest-order digit, a "1" must be inscribed in lieu of a previous "0," and vice versa, for both addition and subtraction; this can be accomplished with the aid of an AND gate connected, on the one hand, to a command lead carrying the adding pulse $C_a$ or the subtracting pulse $C_s$ and, on the other hand, to a feedback lead carrying a complementary output pulse $\bar{U}_1$ representing the inverted value of a bit registered in this first stage. In any higher-order matrix section, however, the AND gates for the adding and subtracting functions must be preceded by other logic networks which derive from the output pulses of the associated stage and of the preceding stage or stages the logical sum $U_k\bar{Z}_k+\bar{U}_kZ_k$ (for adding) or $U_k\bar{Y}_k+\bar{U}_kY_k$ (for subtracting) where $U_k$ and $\bar{U}_k$ are the direct and complementary pulses representing the true and inverted bits, respectively, inscribed in the associated stage, $$Z_k \equiv \prod_{h=1}^{k-1} U_h$$

is the logical product of true values of the binary outputs of all the preceding stages ($h$ being any integer smaller than $k$), $\bar{Z}_k$ is the complement of $Z_k$, $$Y_k \equiv \prod_{h=1}^{k-1} \bar{U}_h$$

is the analogous product of the inverted values, and $\bar{Y}_k$ is the complement of $Y_k$. Since the complement of a logical product equals the logical sum of the complements, we can also write $$\bar{Z}_k \equiv \sum_{h=1}^{k-1} \bar{U}_h \text{ and } \bar{Y}_k \equiv \sum_{h=1}^{k-1} U_h$$

In the case of the second matrix section, $Z_2=\bar{Y}_2=U_1$ and $\bar{Z}_2=Y_2=\bar{U}_1$.

Among the several logic networks available for generating the function $U_k\bar{Z}_k+\bar{U}_kZ_k$ or $U_k\bar{Y}_k+\bar{U}_kY_k$, we prefer for its simplicity an EXCLUSIVE-OR gate connected to receive the input signals $Z_k$ or $Y_k$ and $U_k$. In the second section, this EXCLUSIVE-OR gate is thus connected to two leads respectively carrying, for adding, the signals $U_1$, $U_2$ and, for subtracting, the signals $\overline{U}_1$, $U_2$; in the third and subsequent stages, the EXCLUSIVE-OR gate is preceded by an AND gate which forms the product $Z_k$ or $Y_k$ from the direct or the complementary output pulses $U_1$, $U_2$ or $\overline{U}_1$, $\overline{U}_2$ etc. of the lower-order stages.

Each matrix section may also include further AND gates responsive to other command pulses, such as an entry signal coupled with a numerical pulse to register a bit of a new number, or a unit pulse to register a "1" in a particular stage (usually the first stage), and to the absence of any command pulse to reinscribe a stored bit in the same stage.

According to another feature of our invention, each memory stage includes an input flip-flop and an output flip-flop, the former being settable by the coincidence of a control signal $S_k$ with a first clock pulse and being resettable by a second clock pulse to generate a digital pulse of a duration shorter than the recurrence period $\tau$; this digital pulse, on reaching the other end of the delay line, is differentiated so as to produce a spike (preferably coinciding with its leading edge) for tripping the output flip-flop which is then reset by a third clock pulse. The first, second and third clock pulses are periodically generated with identical cadences equal to $1/\tau$, i.e. to the reciprocal of the recurrence period.

The above and other features of our invention will become more clearly apparent from the following detailed description of a representative embodiment, reference being made to the accompanying drawing in which.

Figure 1:
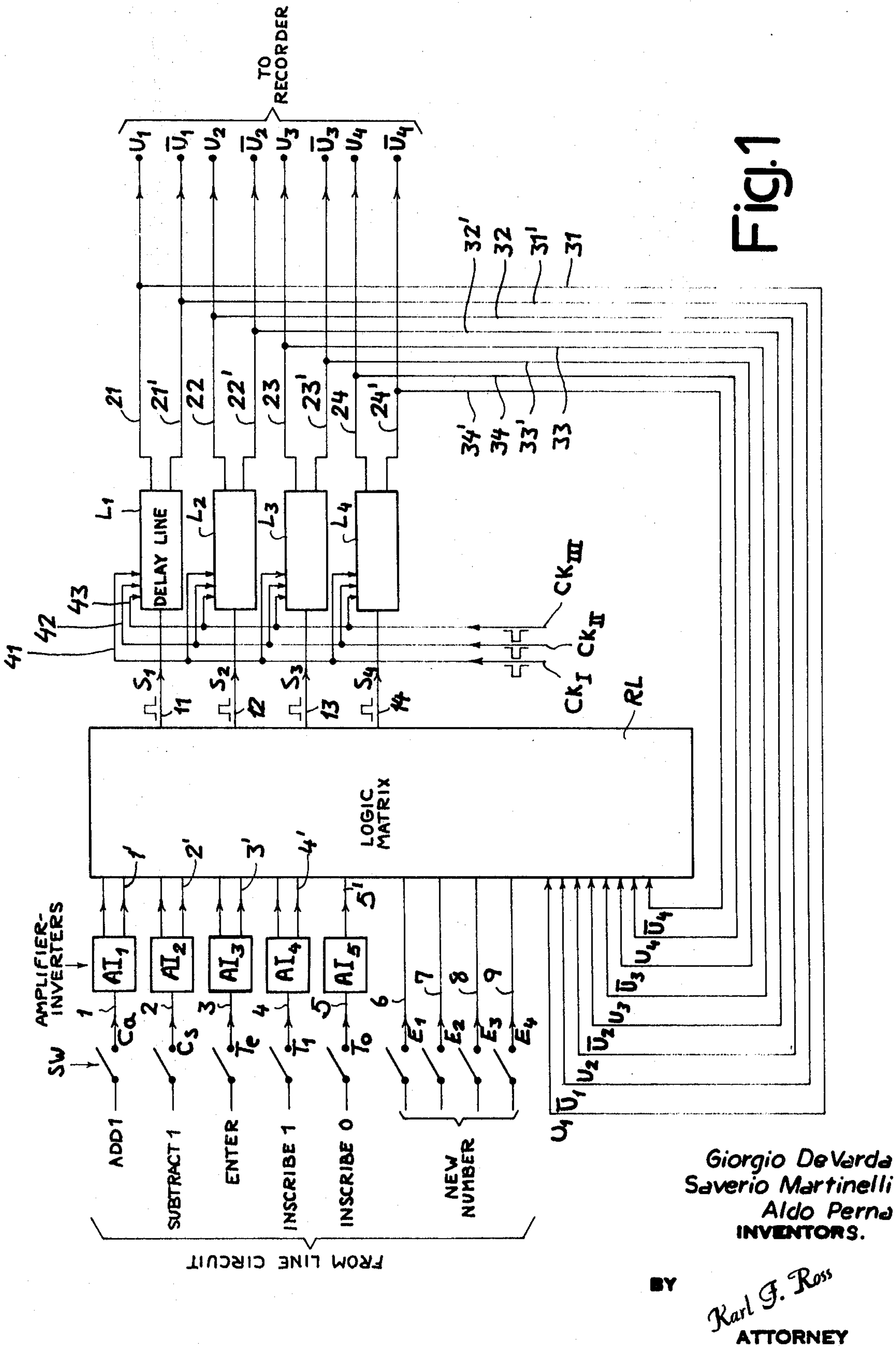
FIG. 1 is an overall block diagram of a counting register according to the invention.

The counting register illustrated in FIG. 1 has input connections to a line circuit and output connections to a recorder, not further illustrated, as conventionally used in telecommunication systems to make a temporary or permanent record of charges accruing during a call. The register has a set of nine input leads terminating at a logic matrix RL, these leads being shown provided with individual switches SW representative of any mechanical or electronic circuit-closing means. The switches SW enable the selective energization of lead 1 by an "ADD 1" command pulse $C_a$, lead 2 by a "SUBTRACT 1" command pulse $C_s$, lead 3 by an entry command pulse $T_e$, lead 4 by an "INSCRIBE 1" or unit command pulse $T_1$, lead 5 by an "INSCRIBE 0" or cancellation command pulse $T_o$, and leads 6, 7, 8 and 9 by respective numerical pulses $E_1$, $E_2$, $E_3$ and $E_4$ representing the bits of a new binary number to be entered. Leads 1–5 include respective amplifier-inverters $AI_1$, $AI_2$, $AI_3$, $AI_4$ and $AI_5$, the first four of these amplifier-inverters being provided with additional output leads 1′, 2′, 3′ and 4′ which carry the complements $\overline{C}_a$, $\overline{C}_o$, $\overline{T}_e$ and $\overline{T}_1$ of signals $C_a$, $C_s$, $T_e$ and $T_1$, respectively; amplifier-inverter $AI_5$ generates only the complement $\overline{T}_o$ in its output.

Logic matrix RL has four output leads 11, 12, 13 and 14 delivering respective control signals $S_1$, $S_2$, $S_3$ and $S_4$ to associated delay lines $L_1$, $L_2$, $L_3$ and $L_4$. Each delay line has two output leads 21, 21′; 22, 22′; and 24, 24′; on these output leads there appear respective pulse pairs $U_1$, $\overline{U}_1$; $U_2$, $\overline{U}_2$; $U_3$, $\overline{U}_3$ and $U_4$, $\overline{U}_4$. The pulses $U_1$–$U_4$, hereinafter referred to as direct output pulses, represent the true values of bits inscribed in the respective delay lines whereas the pulses $\overline{U}_1$–$\overline{U}_4$, hereinafter referred to as complementary output pulses, represent the inverted values of these bits.

The energization of one or more leads 11–14 by a pulse $S_1-S_4$, or by two or more of such pulses occurring simultaneously, represents a word which is propagated along delay lines $L_1-L_4$ under the control of several trains of clock pulses $CK_I$, $CK_{II}$, $CK_{III}$ applied by a pulse generator, not furhter illustrated, to three leads 41, 42, 43 multipled to all the memory stages.

Figure 2:
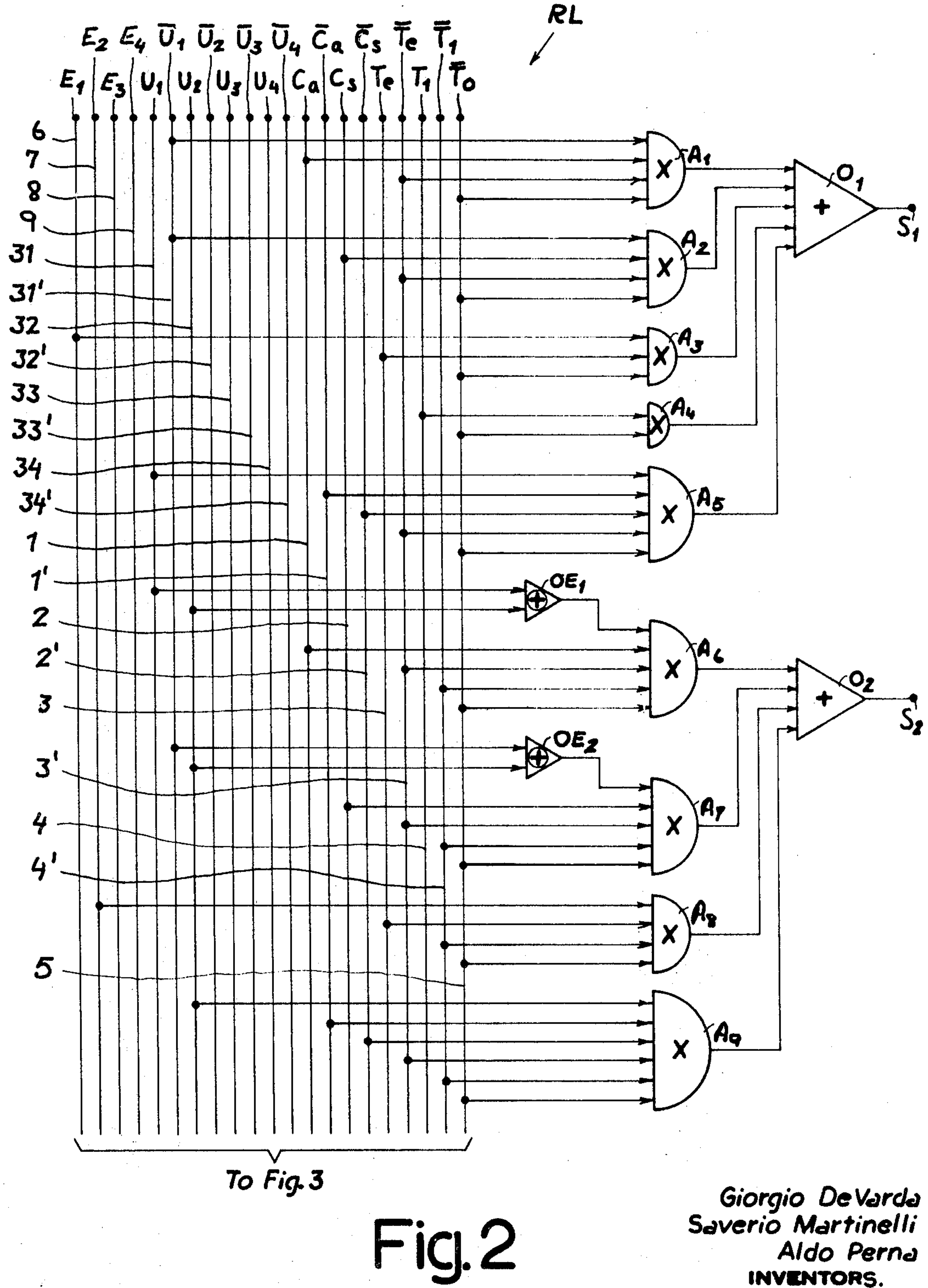
FIGS. 2 and 3 show different sections of a logic matrix forming part of the register of FIG. 1.
Figure 3:
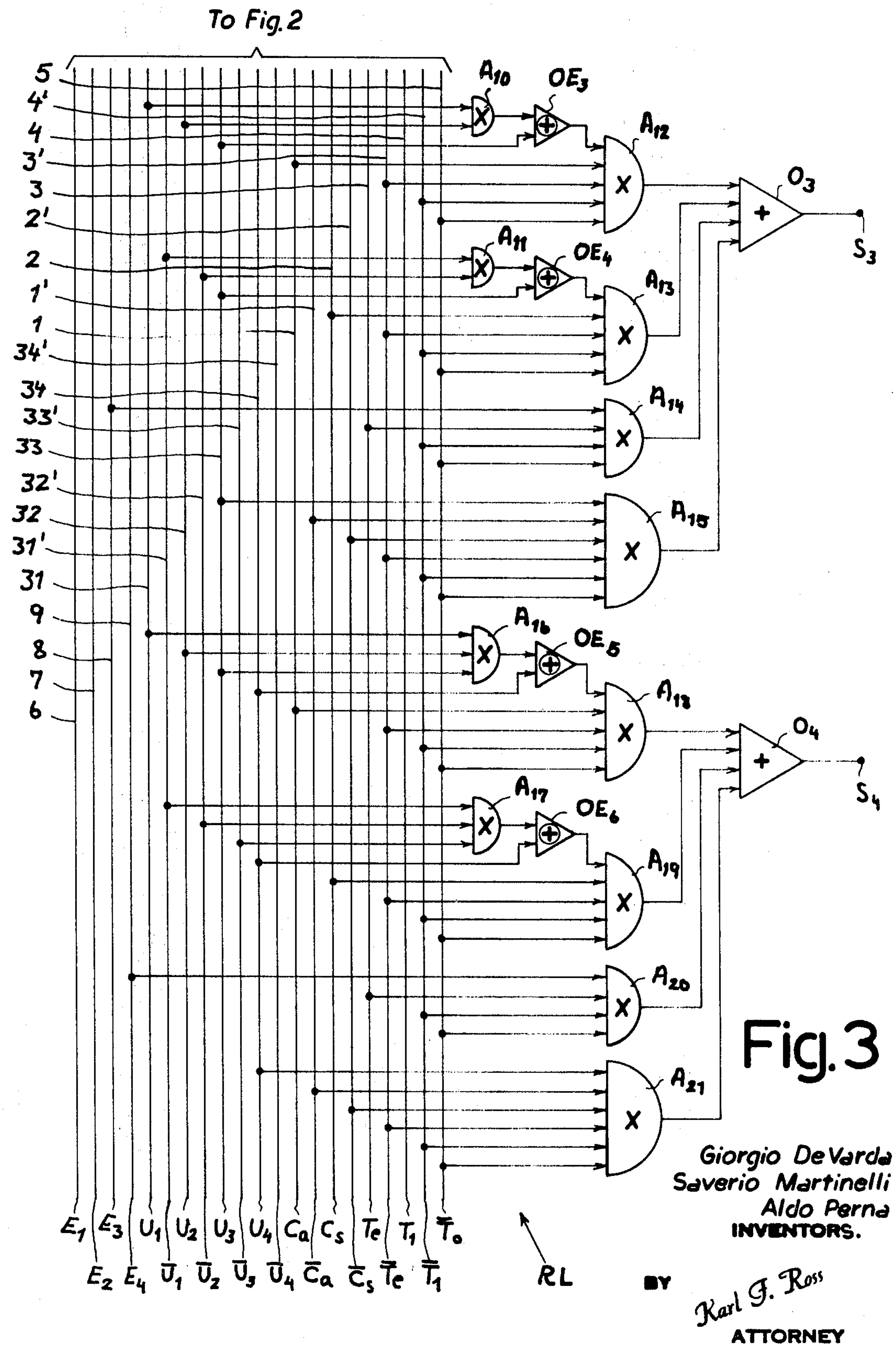

A set of feedback loops 31, 31′, 32, 32′, 33, 33′, 34 and 34′ extend from the output leads 21, 21′ etc. to the input side of the logic matrix RL for the purpose of reinscribing the bits $U_1$, $\overline{U}_1$ etc. or of controlling the incremental modification of the registered words in the presence of a command pulse on lead 1 or 2. As illustrated in FIGS. 2 and 3, matrix RL comprises an orthogonal array of conductors including extensions of leads 1, 1′ etc. and 31, 31′ etc., these two sets of leads intersecting with other conductors terminating at four groups of logic gates defining four matrix sections respectively associated with the output leads 11, 12, 13 and 14. The first two sections, generating the control pulses $S_1$ and $S_2$, are illustrated in FIG. 2; the other two sections, producing the control pulses $S_3$ and $S_4$, are shown in FIG. 3.

The matrix section associated with lead 11 serves to enter, modify, reinscribe or cancel the lowest-order bit of a 4-bit word, the other three sections serving the same functions for successively higher denominations. Naturally, the number of matrix sections (and of associated memory stages $L_1$–$L_4$) may be further increased if desired.

The 1matrix section is provided with five AND gates $A_1$, $A_2$, $A_3$, $A_4$ and $A_5$ whose outputs are all multiplied to conductor 11 through a common OR gate $O_1$. The second sections contains four AND gates $A_6$, $A_7$, $A_8$ and $A_9$, working into a common OR gate $O_2$, and a pair of EXCLUSIVE-OR gates $OE_1$, $OE_2$ in the inputs of gates $A_6$ and $A_7$, respectively. The third section has an OR gate $O_3$ fed by AND gates $A_{12}$, $A_{13}$, $A_{14}$ and $A_{15}$, two EXCLUSIVE-OR gates $OE_3$ and $OE_4$ in the inputs of gates $A_{12}$ and $A_{13}$, and two further AND gates $A_{10}$ and $A_{11}$ ahead of gates $OE_3$ and $OE_{44}$, respectively. The fourth section is of essentially the same construction as the third section, with four main AND gates $A_{18}$, $A_{19}$, $A_{20}$ and $A_{21}$, a common OR gate $O_4$, two EXCLUSIVE-OR gates $OE_5$, $OE_6$ and two auxiliary AND gates $A_{16}$ and $A_{17}$. Any higher-order matrix section would be analogous to the two sections illustrated in FIG. 3.

Each of the principal AND gates $A_1-A_9$, $A_{12}-A_{15}$ and $A_{18}-A_{21}$ has an input connected to lead 5, which is energized in the absence of a cancellation signal "INSCRIBE 0," thus carrying the command $\overline{T}_o$. Lead 4′, carrying the command $\overline{T}_1$, is connected to the inputs of all the principal AND gates except those of the first section; its companion lead 4 feeds the complementary command $T_1$ to gate $A_4$ only. Lead 3, energized in response to the command $T_e$, is connected to gates $A_3$, $A_8$, $A_{14}$ and $A_{20}$ which also have inputs tied to leads 6, 7, 8 and 9, respectively; all the other principal AND gates have inputs connected to the companion lead 3′ carrying the complementary command $\overline{T}_e$. Lead 1 (command $C_a$) is connected to gates $A_1$, $A_6$, $A_{12}$ and $A_{18}$ whereas lead 2 (command $C_s$) supplies the gates $A_2$, $A_7$, $A_{13}$ and $A_{19}$; their companion leads 1′ (command $\overline{C}_a$) and 2′ (command $\overline{C}_s$) are tied to gates $A_5$, $A_9$, $A_{15}$ and $A_{21}$.

In addition, lead 31 (output $U_1$) is connected to gates $A_5$, $OE_1$, $A_{10}$ and $A_{16}$; lead 31′ (output $\overline{U}_1$) is tied to gates $A_1$, $A_2$, $OE_2$, $A_{11}$ and $A_{17}$. Lead 32 (output $U_2$) supplies the gates $OE_1$, $OE_2$, $A_9$, $A_{10}$ and $A_{16}$; lead 32′ (output $\overline{U}_2$) feeds the gates $A_{11}$ and $A_{17}$. Lead 33 (output $U_3$) is tied to gates $OE_3$, $OE_4$, $A_{15}$ and $A_{16}$; lead 33′ (output $\overline{U}_3$) is connected to gate $A_{17}$. Lead 34 (output $U_4$) energizes the gates $OE_5$, $OE_6$ and $A_{21}$; lead 34′ (output $\overline{U}_4$) does not control any gates in the four-stage register illustrated in the drawing but would be needed if additional stages were used.

With the connections described above, the four control pulses appearing on leads 11–14 satisfy the following logical equations:

$$S_1=(\overline{U}_1C_a\overline{T}_e+\overline{U}_1C_s\overline{T}_e+E_1T_e+T_1+U_1\overline{C}_a\overline{C}_s\overline{T}_e)\overline{T}_0 \quad (1)$$

$$S_2=[(U_1\overline{U}_2+\overline{U}_1U_2)C_a\overline{T}_e+(\overline{U}_1\overline{U}_2+U_1U_2)C_s\overline{T}_e+E_2T_e+U_2\overline{C}_a\overline{C}_s\overline{T}_e]\overline{T}_0\overline{T}_1 \quad (2)$$

$$S_3=[(U_1U_2\overline{U}_3+\overline{U}_1U_3+\overline{U}_2U_3)C_a\overline{T}_e+(\overline{U}_1\overline{U}_2\overline{U}_3+U_1U_3+U_2U_3)C_s\overline{T}_e+E_3T_e+U_3\overline{C}_a\overline{C}_s\overline{T}_e]\overline{T}_0\overline{T}_1 \quad (3)$$

$$S_4=[(U_1U_2U_3\overline{U}_4+\overline{U}_1U_4+\overline{U}_2U_4+\overline{U}_3U_4)C_a\overline{T}_e+(\overline{U}_1\overline{U}_2\overline{U}_3\overline{U}_4+U_1U_4+U_2U_4+U_3U_4)C_s\overline{T}_e+E_4T_e+U_4\overline{C}_a\overline{C}_s\overline{T}_e]\overline{T}_0\overline{T}_1. \quad (4)$$

Using the symbols previously adopted, we may rewrite the first two terms of equations (2) in the form $$(\overline{U}_2Z_2\mp U_2\overline{Z}_2)C_a\overline{T}_e+(\overline{U}_2Y_2+U_2\overline{Y}_2)C_s\overline{T}_e$$

which, with conventional notation, can also be expressed as the circle sum $$(U_2\oplus Z_2)T_a\overline{T}_e+(U_2\oplus Y_2)C_sT_e;$$

by the same token, the corresponding terms of equations (3) and (4) become $$(U_3\oplus Y_3)C_s\overline{T}_e$$

and $$(U_4\oplus Y_4)C_s\overline{T}_e.$$

Thus we can generalize these terms for any matrix section other than the first one in the form $$(U_k\oplus Z_k)C_a\overline{T}_e+(U_k\oplus Y_k)C_s\overline{T}_e \equiv (U_k\overline{Z}_k+\overline{U}_kZ_k)C_a\overline{T}_e+(U_k\overline{Y}_k+\overline{U}_kY_k)C_s\overline{T}_e.$$

More particularly, gates $OE_1$–$OE_6$ serve to form the circle sums of equations (2), (3) and (4) whereas the auxiliary AND gates $A_{10}$, $A_{11}$ and $A_{16}$, $A_{17}$ generate the logical products $$Z_3\equiv U_1U_2,\ Y_3\equiv\overline{U}_1\overline{U}_2 \text{ and } Z_4\equiv U_1U_2U_3,\ Y_4\equiv\overline{U}_1\overline{U}_2\overline{U}_3.$$

The logic matrix RL shown in FIGS. 1–3 functions in the following manner:

As long as all the switches SW are open, gates $A_5$, $A_9$, $A_{15}$ and $A_{21}$ are opened whenever a pulse $U_1$, $U_2$, $U_3$ or $U_4$ appears on lead 31, 32, 33 or 34, respectively, so as to give rise to a corresponding command pulse $S_1$, $S_2$, $S_3$ or $S_4$ which reinscribes the same output pulse on the associated delay line $L_1$, $L_2$, $L_3$ or $L_4$. Any word registered in these delay lines is thus continuously recirculated.

If a new word is to be entered, lead 3 must be energized together with a selected combination of leads 6–9. If none of the four bottom switches SW is closed while the entry command $T_e$ is given on lead 3, this command acts as a cancellation signal (equivalent to energization of lead 5) by blocking the reinscription gates $A_5$, $A_9$, $A_{15}$ and $A_{21}$. If any of leads 6–9 is connected to potential at the same time, the corresponding gate $A_3$, $A_8$, $A_{14}$ or $A_{20}$ operates to enter a binary pulse or bit on the associated output lead 11, 12, 13 or 14.

Energization of lead 4 also inhibits reinscription but opens the gate $A_4$ to enter a bit in the units memory stage $L_1$. Naturally, similar connections could be made to one or more of the other stages if a numerical value other than "1" were to be registered upon closure of the No. 3 switch SW.

It is assumed that the two uppermost switches SW cannot be closed simultaneously so that energization of leads 1 and 2 is mutually exclusive, hence no interdictory cross-connection need to be made between leads 1', 2' and the gates connected to leads 2 and 1, respectively. It will be readily apparent that, with the circuitry shown and described, energization of lead 1 adds the value of unity to an amount stored in the memory $L_1$–$L_4$ whereas energization of lead 2 subtracts this amount from the stored value. During such addition or subtraction, recirculation through gates $A_5$, $A_9$, $A_{15}$ and $A_{21}$ is, of course, inhibited.

Figure 4:
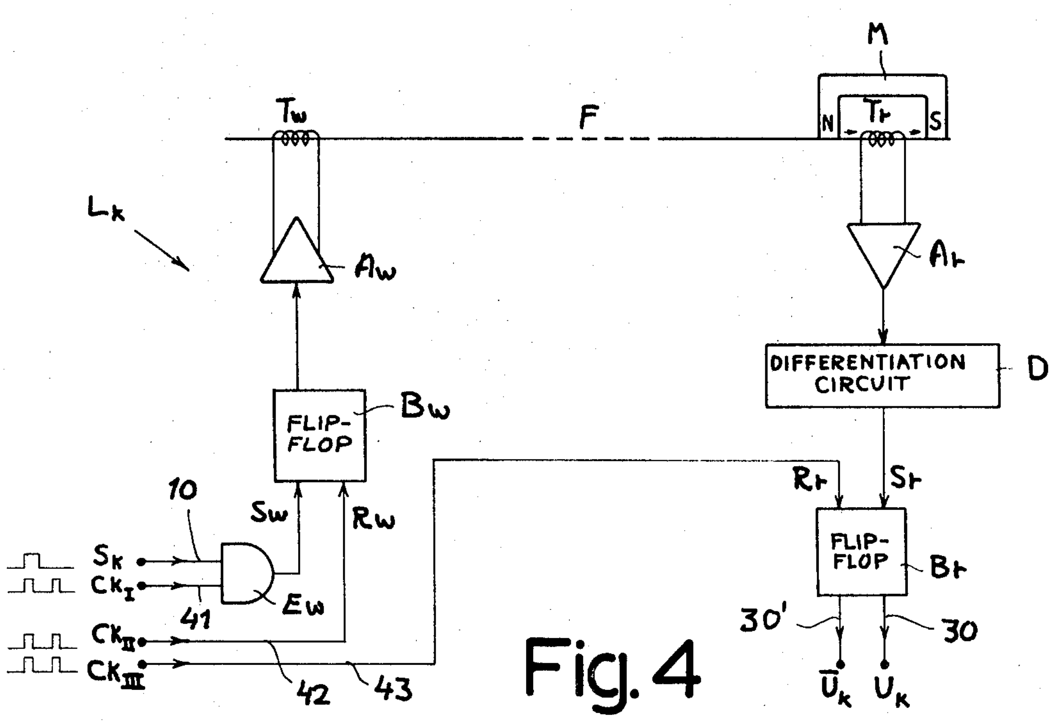
FIG. 4 is a circuit diagram of a memory stage forming part of the register.

Reference will now be made to FIG. 4 for a description of a memory stage $L_k$ representative of any of the four stages $L_1$–$L_4$ shown in FIG. 1.

Memory stage $L_k$ has four input leads 10, 41, 42 and 43, lead 10 being representative of any one of leads 11–14 in FIG. 1 and carrying an output pulse $S_k$ whenever the associated matrix section generates a true signal. Leads 10 and 41 terminate at an AND gate *Ew* connected to the setting input *Sw* of a writing flip-flop or bistable multivibrator *Bw*; the resetting input *Rw* of flip-flop *Bw* is connected to lead 42. This flip-flop, when set, produces an output signal in the input of a writing amplifier *Aw* which is energized from a source of alternating current, not shown, to generate oscillations in a writing coil *Tw* wound around one end of a magnetostrictive wire F whose other end similarly traverses a reading coil *Tr* in the input of a reading amplifier *Ar*; a permanent or electrically excited magnet M generates a biasing field axially along coil *Tr*. The delayed signal picked up by coil *Tr* is amplified and rectified in amplifier *Ar* and differentiated in a circuit D which has an output connected to the setting input *Sr* of a reading flip-flop or bistable multivibrator *Br*; the resetting input *Rr* of this flip-flop is tied to lead 43. Flip-flop *Br* has two outputs 30 and 30' (representative of any of leads 31–34 and 31'–34') which are alternately energized to generate the output signal $U_k$ or $\overline{U}_k$.

The operation of the memory stage $L_k$ will now be described with reference to FIG. 5.

Figure 5:
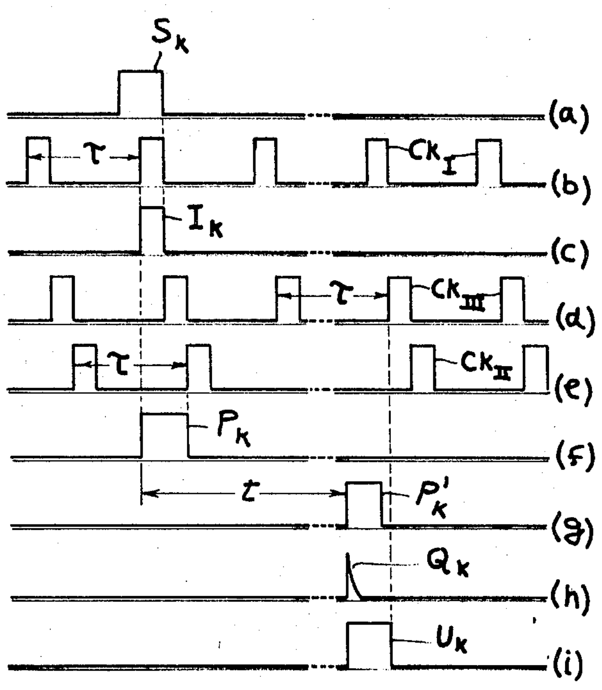
FIG. 5 is a set of graphs used in explaining the operation of the system of FIGS. 1–4.

Graph (*a*) of FIG. 5 shows the control pulse $S_k$ which has a width somewhat greater than that of clock pulses $CK_I$, $CK_{II}$, $CK_{III}$ illustrated in graphs (*b*), (*e*) and (*d*), respectively. Gate *Ew*, opened during the period of overlap of pulses $S_k$ and $CK_I$, generates on input pulse $I_k$, graph (*c*), which trips the flip-flop *Bw* to initiate the generation of a binary pulse $P_k$, graph (*f*), transmitted along delay line F. After a delay of duration $t=p\tau$ ($\tau$ being the recurrence period of clock pulses $CK_I$, $CK_{II}$ and $CK_{III}$), this binary pulse is picked up by coil *Tr* as a pulse $P_k'$ shown in graph (*g*). The latter pulse is then differentiated to deliver a spike $O_k$ coinciding with its leading edge, the corresponding trailing-edge spike of opposite polarity being suppressed by a rectifier not shown. Spike $Q_k$, in tripping the flip-flop *Br*, starts an output pulse $U_k$ which is terminated by the occurrence of the next clock pulse $CK_{III}$ so that its width is independent of that of pulse $P_k'$ which may have undergone some deformation in its travel along line F.

Thus, the width of pulse $P_k$ is determined by the relative staggering of pulse trains $CK_I$ and $CK_{II}$ whereas, if *p* is a whole number, the width of pulse $U_k$ substantially equals the phase difference between pulse trains $CK_I$ and $CK_{III}$. If control pulse $S_k$ is a replica of a previous output pulse $U_k$ to be reinscribed, the two pulses will of course have the same width.

The maximum number of pulses $P_k$ propagating simultaneously along wire F is equal to $p=t/\tau$. Naturally, the command pulse in the input of matrix RL (FIG. 1) must be timed to coincide, substantially, with a single clock pulse $CK_I$ and, like pulses $S_k$ and $U_k$, must have a width smaller than the recurrence period $\tau$. If the register is used in a telephone system for the concurrent transmission of calls over a common line circuit by the time-sharing method described above, e.g. as disclosed in commonly owned application Ser. No. 636,164 filed 4 May 1967 by Fabio Balugani et al., the period $\tau$ should of course correspond to the duration of a coding interval allotted to the sampling of a message signal, such interval being usually on the order of microseconds.

We claim:

1. A counting register for concurrently storing a plurality of binary words conveying numerical information relating to a plurality of different items and for selectively modifying the information so stored, comprising:

a plurality of substantially identical parallel memory stages including each a delay line for the transmission of a series of digital pulses from an input of each stage to an output thereof, each digital pulse representing a bit of a respective word, the delay time of said delay line being a multiple of the fundamental recurrence period of said digital pulses whereby a plurality of such pulses can be simultaneously inscribed in said delay line;

a logic matrix connected to the inputs of all said stages for controlling the inscription of digital pulses on the respective delay line thereof;

feedback means connecting the output of each stage with the input thereof through said logic matrix for periodically reinscribing each digital pulse on the same delay line to perpetuate the information stored in said register stages;

and command means connected to said logic matrix for modifying, during a selected recurrence period, the information to be reinscribed;

said logic matrix comprising a first section for the lowest-order memory stage and an additional section for each higher-order memory stage, a first set of leads common to all said sections and selectively energizable by said command means, a second set of leads common to all said sections and selectively energizable by said feedback means, and a plurality of logic gates in each section having input connections to respective combinations of leads from said first and second sets and having a single output connection to the input of the corresponding memory stage.

2. A counting register as defined in claim 1 wherein each of said stages is provided with an input flip-flop and an output flip-flop, a source of first and second clock pulses connected to said input flip-flop for respectively setting and resetting same in the presence of a control pulse in the output of said logic matrix, the input flip-flop being connected to energize said delay line in response to said first and second clock pulses for generating therein a digital pulse of a duration shorter than said recurrence period, differentiation means connected between said delay line and said output flip-flop for setting the latter in response to an edge of the delayed digital pulse, and a source of third clock pulses connected to said output flip-flop for resetting same, said first, second and third clock pulses having identical cadences corresponding to the reciprocal of said recurrence period.

3. A counting register as defined in claim 1 wherein said logic gates of each section include an OR gate provided with said single output connection and a plurality of AND gates connected in parallel to the input side of said OR gate.

4. A counting register as defined in claim 3 wherein said feedback means includes bistable means in each stage for delivering a direct output pulse $U_k$ and a complementary output pulse $\overline{U}_k$ respectively representing the true value and the inverted value of a corresponding bit, said second set of leads including a respective conductor pair for each stage, the conductors of said pair being connnected to carry the pulses $U_k$ and $\overline{U}_k$, respectively, $k$ being an integer identifying the respective stage.

5. A counting register as defined in claim 4 wherein the number of register stages is greater than two, said command means including switch means for selectively generating an adding command pulse $C_a$ and its complement $\overline{C}_a$ on a first pair of leads of said first set, a subtracting command pulse $C_s$ and its complement $\overline{C}_s$ on a second pair of leads of said first set, an entry command pulse $T_e$ and its complement $\overline{T}_e$ on a third pair of leads of said first set, a unit command pulse $T_1$ and its complement $\overline{T}_1$ on a fourth pair of leads of said first set, and a plurality of numerical pulses $E_1$, $E_2$ etc. on respective further leads of said first set, the number of said further leads equaling the number of said memory stages; the logic gates of said first stage comprising a first AND gate connected to receive the complementary first-stage output pulse $\overline{U}_1$ and the command pulses $C_a$ and $\overline{T}_e$, a second AND gate connected to receive the complementary first-stage output pulse $\overline{U}_1$ and the command pulses $C_s$ and $\overline{T}_e$, a third AND gate connected to receive the first numerical pulse $E_1$ and the command pulse $T_e$, a fourth AND gate connected to receive said unit command pulse $T_1$, and a fifth AND gate connected to receive the first-stage output pulse $U_1$ and the command pulses $\overline{C}_a$, $\overline{C}_s$, $\overline{T}_e$ and $\overline{T}_1$; the logic gates of the second stage comprising a first EXCLUSIVE-OR gate connected to receive the direct output pulses $U_1$ and $U_2$ of said first and second stages, a second EXCLUSIVE-OR gate connected to receive the complementary first-stage output pulse $\overline{U}_1$ and the direct second-stage output pulse $U_2$, a sixth AND gate connected to receive the output of said first EXCLUSIVE-OR gate and the command pulses $C_a$, $\overline{T}_a$ and $\overline{T}_1$, a seventh AND gate connected to receive the output of said second EXCLUSIVE-OR gate and the command pulses $C_s$, $\overline{T}_e$ and $\overline{T}_1$, an eighth AND gate connected to receive the second numerical pulse $E_2$ and the command pulses $T_e$ and $\overline{T}_1$, and a ninth AND gate connected to receive the direct second-stage output pulse $U_2$ and the command pulses $\overline{C}_a$, $\overline{C}_s$, $\overline{T}_e$ and $\overline{T}_1$; each further stage comprising a tenth AND gate connected to receive the direct output pulses of all preceding stages, an eleventh AND gate connected to receive the complementary output pulses of all preceding stages, a third EXCLUSIVE-OR gate connected to receive the output of said tenth AND gate and the direct output pulse of said further stage, a fourth EXCLUSIVE-OR gate connected to receive the output of said eleventh AND gate and the complementary output pulse of said further stage, a twelfth AND gate connected to receive the output of said third EXCLUSIVE-OR gate and the command pulses $C_a$, $\overline{T}_e$ and $\overline{T}_1$, a thirteenth AND gate connected to receive the output of said fourth EXCLUSIVE-OR gate and the command pulses $C_s$, $\overline{T}_e$ and $\overline{T}_1$, a fourteenth AND gate connected to receive the numerical pulse associated with said further stage and the command pulses $T_e$ and $\overline{T}_1$, and a fifteenth AND gate connected to receive the direct output pulse of said further stage and the command pulses $\overline{C}_a$, $\overline{C}_s$, $\overline{T}_e$ and $\overline{T}_1$; each of said AND gates being further connected to another lead of said first set energized by said command means in the absence of a cancellation signal.

6. A counting register as defined in claim 4 wherein said command means includes switch means for selectively generating an incremental command pulse and the complement of said incremental command pulse on two leads of said first set, respectively, the logic gates of each stage including a first AND gate connected to one of said two leads for receiving said incremental command pulse and a second AND gate connected to the other of said two leads for receiving said complement thereof, said first AND gate of said first section being further connected to one of the conductors of the corresponding pair for receiving the complementary output pulse $\overline{U}_1$ of said first stage, said second AND gate of any section being further connected to the other conductor of said corresponding pair for receiving the direct output pulse $U_k$ of the corresponding stage, said first AND gate of each additional section of said logic matrix having input connections to at least one of the paired conductors associated with the corresponding stage and with each lower-order stage.

7. A counting register as defined in claim 6 wherein said incremental command pulse is an adding pulse $C_a$ having a complement $\overline{C}_a$, said input connections of each additional section of said logic matrix including a logic network connected to supply to said first AND gate thereof the logical function $U_k \oplus Z_k$ where $Z_k$ is the logical product of the true values of the respective bits of all preceding stages, said first and second AND gates of each additional section being connected to receive directly the command signal $C_a$ and the complement $\overline{C}_a$, respectively.

8. A counting register as defined in claim 6 wherein said incremental command pulse is a subtraction pulse $C_s$ having a complement $\overline{C}_s$, said input connections of each additional section of said logic matrix including a logic network connected to supply to said first AND gate thereof the logical function $U_k \oplus Y_k$ where $Y_k$ is the logical product of the inverted values of the respective bits of all preceding stages, said first and second AND gates of each additional section being connected to receive directly the command signal $C_s$ and the complement $\overline{C}_s$, respectively.

9. A counting register for concurrently storing a plurality of binary words conveying numerical information relating to a plurality of different items and for selectively modifying the information so stored, comprising:

- a plurality of substantially identical parallel memory stages including each a delay line for the transmission of a series of digital pulses from an input of each stage to an output thereof, each digital pulse representing a bit of a respective word, the delay time of said delay line being a multiple of the fundamental recurrence period of said digital pulses whereby a plurality of such pulses can be simultaneously inscribed in said delay line;
- a logic matrix connected to the inputs of all said stages for controlling the inscription of digital pulses on the respective delay line thereof;

feedback means connecting the output of each stage with the input thereof through said logic matrix for periodically reinscribing each digital pulse on the same delay line to perpetuate the information stored in said register stages;

and command means connected to said logic matrix for modifying, during a selected recurrence period, the information to be reinscribed;

each of said stages being provided with an input flip-flop and an output flip-flop, a source of first and second clock pulses connected to said input flip-flop for respectively setting and resetting same in the presence of a control pulse in the output of said logic matrix, the input flip-flop being connected to energize said delay line in response to said first and second clock pulses for generating therein a digital pulse of a duration shorter than said recurrence period, differentiation means connected between said delay line and said output flip-flop for setting the latter in response to an edge of the delayed digital pulse, and a source of third clock pulses connected to said output flip-flop for resetting same, said first, second and third clock pulses having identical cadences corresponding to the reciprocal of said recurrence period.

10. A counting register as defined in claim 9 wherein said delay line is a magnetostrictive wire provided at one end with a writing coil connected to said input flip-flop and at the other end with a reading coil connected to said output flip-flop.

11. A counting register for concurrently storing a plurality of binary words conveying numerical information relating to a plurality of different items and for selectlvely modifying the information so stored, comprising:

a plurality of substantially identical parallel memory stages including each a magnetorestrictive wire provided at one end with a writing coil and at the other end with a reading coil for the delayed transmission of a series of digital pulses from an input of each stage to an output thereof, each digital pulse representing a bit of a respective word, the delay time of said wire between said coils being a multiple of the fundamental recurrence period of said digital pulses whereby a plurality of such pulses can be simultaneously inscribed in said wire;

a logic matrix connected to the inputs of all said stages for controlling the inscription of digital pulses on the respective wire thereof;

feedback means connecting the reading coil of each stage with the writing coil thereof through said logic matrix for periodically reinscribing each digital pulse on the same wire to perpetuate the information stored in said register stages;

and command means connected to said logic matrix for modifying, during a selected recurrence period, the information to be reinscribed;

said logic matrix comprising a first section for the lowest-order memory stage and an additional section for each higher-order memory stage, a first set of leads common to all said sections and selectively energizable by said command means, a second set of leads common to all said sections and selectively energizable by said feedback means, and a plurality of said logic gates in each section having input connections to respective combinations of leads from said first and second sets and having a single output connection to the input of the corresponding memory stage.